United States Patent [19]

McWhirter et al.

[11] Patent Number: 4,477,848
[45] Date of Patent: Oct. 16, 1984

[54] VERIFICATION OF RECORDED MESSAGES

[75] Inventors: Ian McWhirter; Richard B. Morgan, both of Hornsby, Australia

[73] Assignee: McWhirter Holdings Pty. Limited, Hornsby, Australia

[21] Appl. No.: 414,533

[22] PCT Filed: Dec. 16, 1981

[86] PCT No.: PCT/AU81/00190
§ 371 Date: Aug. 10, 1982
§ 102(e) Date: Aug. 10, 1982

[87] PCT Pub. No.: WO82/02111
PCT Pub. Date: Jun. 24, 1982

[30] Foreign Application Priority Data

Dec. 16, 1980 [AU] Australia .............................. PE6962
Feb. 13, 1981 [AU] Australia .............................. PE7608
Feb. 23, 1981 [AU] Australia .............................. PE7711
Apr. 15, 1981 [AU] Australia .............................. PE8458
May 27, 1981 [AU] Australia .............................. PE9043
Jul. 10, 1981 [AU] Australia .............................. PE9699
Aug. 18, 1981 [AU] Australia .............................. PE0309

[51] Int. Cl.³ ..................... G11B 15/04; G11B 15/02; G11B 5/43
[52] U.S. Cl. ....................................... 360/60; 360/18; 360/22; 360/27
[58] Field of Search ....................... 360/18, 22, 24, 27, 360/53, 60

[56] References Cited

U.S. PATENT DOCUMENTS

| 2,989,595 | 6/1961 | Hunter | 179/100.2 |
|---|---|---|---|
| 3,088,101 | 4/1963 | Shrimpf | 360/53 |
| 3,188,615 | 6/1965 | Wilcox, Jr. | 340/174.1 |
| 3,591,731 | 7/1971 | Stancil | 179/100.2 |
| 3,723,878 | 3/1973 | Miller | 360/22 |
| 4,004,089 | 1/1977 | Richard et al. | 360/18 |
| 4,040,099 | 8/1977 | Cook | 360/29 |
| 4,052,565 | 10/1977 | Baxter et al. | 360/53 |
| 4,086,634 | 4/1978 | Cook | 360/60 |
| 4,126,761 | 11/1978 | Gaupe et al. | 360/18 |
| 4,193,061 | 3/1980 | Zoltzi | 360/18 |
| 4,194,222 | 3/1980 | Ebbings | 360/18 |
| 4,380,029 | 4/1983 | Bode | 360/53 |

Primary Examiner—Vincent P. Canney
Attorney, Agent, or Firm—Ladas & Parry

[57] ABSTRACT

The invention provides for the recording of an audio message and subsequent playback thereof and includes a facility for establishing whether the playback message is an authentic reproduction of the original message. The facility is obtained by producing a first data signal indicative of the audio message and recording it together with the audio message and producing a second data signal indicative of the playback message, and comparing the first and the second data signals to establish that the playback is an authentic reproduction of the original message if parity exists between the data signals.

19 Claims, 16 Drawing Figures

BLOCK DIAGRAM
RECORDER / ENCODER

VERIFICATION OF RECORDED MESSAGES

The present invention relates to the recording of information or messages at a first time and the subsequent reproduction of such messages at a later time together with an indication of the authenticity of the reproduced message.

In many applications it is desirable to be able to, for example, tape record a conversation or verbal statement and then at a later date play back the statement or conversation in such a way that the authenticity of the recording cannot be called into question.

This is particularly the case if such recordings are to be used in legal proceedings, particularly to record statements, interviews or confessions by persons suspected of a crime. In order to be admissable as evidence in Court, such recordings must, when played back, be capable of ready detection if not in every way authentic.

Apparatus has previously been provided for the recording of conversations and messages, especially in the field of communication recording systems, which incorporates voice logging where a digital time code is simultaneously recorded with the speech and a visual numerical display provided on playback. A system of this kind is described in U.S. Pat. No. 4,194,222 which although employing multiplexing of the time code and the audio on a single channel, the time code is recorded out of phase between two channels to assist in cancelling the time code subsequently from the audio. In such a system, however, it is possible without detection to tamper with the message after segregating it and subsequently returning it to the tape. Prior art arrangements of this kind also suffer from other disadvantages in that they include the requirement for multiple recording heads and that the design of the recorder/encoder is far too complex.

Many systems have also been proposed for scrambled and encyphered transmission of audio signals with inclusion in the transmission of various control or synchronising signals. However, in those instances there is no safeguard incorporated against the form of tampering referred to above. The examples of such prior arts systems occur in the specifications of U.S. Pat. Nos. 4,193,061; 4,126,761; 4,052,565; 4,004,089; 3,696,207; 3,723,878 and 3,723,364.

It is the principal object of this invention to obtain in a reasonably simple and effective manner the verification of recorded messages.

According to one aspect of the present invention there is disclosed a method of recording an original audio message and of subsequently reproducing said message while indicating the authenticity of said reproduction, said method comprising the steps of converting said original audio message to a first electrical message signal, generating first message information dependent on the instantaneous content of said first electrical message signal, forming a data signal from said first message information; forming a composite signal from said first message signal and said data signal; recording said composite signal on a record medium; recovering said composite signal from said record medium; resolving said composite signal into a second electrical message signal and said data signal, generating second message information dependent on the instantaneous content of said second message signal; making a comparison between said second message information and the message information contained in the resolved data signal and providing an indication whenever said comparison reveals lack of parity.

According to another aspect of the present invention there is disclosed apparatus for reproducing an original audio message which has been recorded on a magnetic tape as a composite signal including also a first data stream indicative of instantaneous values of a parameter of said audio message at the time of recording said message, said apparatus comprising an audio section separating said message from said composite signal for playback of said audio message, encoding means responding to said separated audio message to produce a second data stream indicative of instantaneous values of said parameter of said separated audio message, a section for separating said first data stream from said composite signal, means for comparing said second data stream with said first data stream, and means for generating a signal upon the occurrence of lack of parity between said first and said second data streams, whereby the absence of said signal indicates authentic reproduction of the original audio message.

According to a further aspect of the present invention there is disclosed a recording/reproduction system for recording in a recorder and on a record medium a composite signal including signals representative of an original audio message and a data stream, and for reproducing subsequently in a reproducer and from said record medium the composite signal and resolving therefrom the signals representative of the audio message and the data stream, and effecting playback of the audio message and indicating whether said playback is an authentic representation of said original audio message, said system being characterized in that said recorder data stream is representative of the periodic instantaneous content of a parameter of said original audio message signals, a comparison is made between said resolved data stream and a second data stream generated in said reproducer and representative of the periodic instantaneous content of said parameter of said resolved audio message signals, and an indication is provided from said comparison as to whether said resolved audio message is an authentic reproduction of said original audio message.

According to a still further aspect of the present invention there is disclosed apparatus for recording upon a record medium an original audio message and a signal for subsequent use in a reproducer to establish whether the audio message reproduced from said record medium is an authentic reproduction of said original audio message, said apparatus comprising transducer means for converting said original audio message to an electrical analogue signal, sampling means deriving from said analogue signal a data signal, in two data bits, representative of periodic instantaneous values of a parameter of said analogue signal, mixer means for combining said analogue signal with said data signal in a composite signal, and a recording head for recording said composite signal on said record media.

According to a still further aspect of the present invention there is disclosed a method of recording upon a record medium an original audio message and a signal for subsequent use in a reproducer to establish whether the audio message reproduced from said record medium is an authentic reproduction of said original audio message, said method comprising the steps of converting said original audio message to a first electrical analogue signal, deriving from said first analogue signal a two bit data signal representative of periodic instantaneous values of a parameter of said first analogue signal, converting said data signal to a second electrical analogue signal, combining said first and said second analogue signals into a composite signal, and recording its composite signal on said record medium.

According to a still further aspect of the present invention there is disclosed a housing for a record medium, said housing having a finger print recording surface adapted to permit recording of a finger print of an interviewee recorded on said record medium, and means to protect said surface prior to recordal of said finger print.

According to still another aspect of the present invention there is disclosed a housing for a coiled record medium transferable from a first spool to a second spool during the recording process, wherein the side of said first spool, and the opposite side of said second spool, are optically encoded and said housing adjacent said sides is transparent.

According to an associated aspect of the present invention there is disclosed a method of verification of recorded messages in which information data and record medium data are simultaneously recorded on a coiled record medium transferable from a first spool to a second spool during the recording process, said record medium data being indicative of the speed of rotation of one of said spools at the instant of recording and hence the location within said coiled record medium of the data recorded at said instant.

One embodiment of the present invention will now be described with reference to the accompanying drawings in which.

DESCRIPTION OF EMBODIMENT

Figure 1:
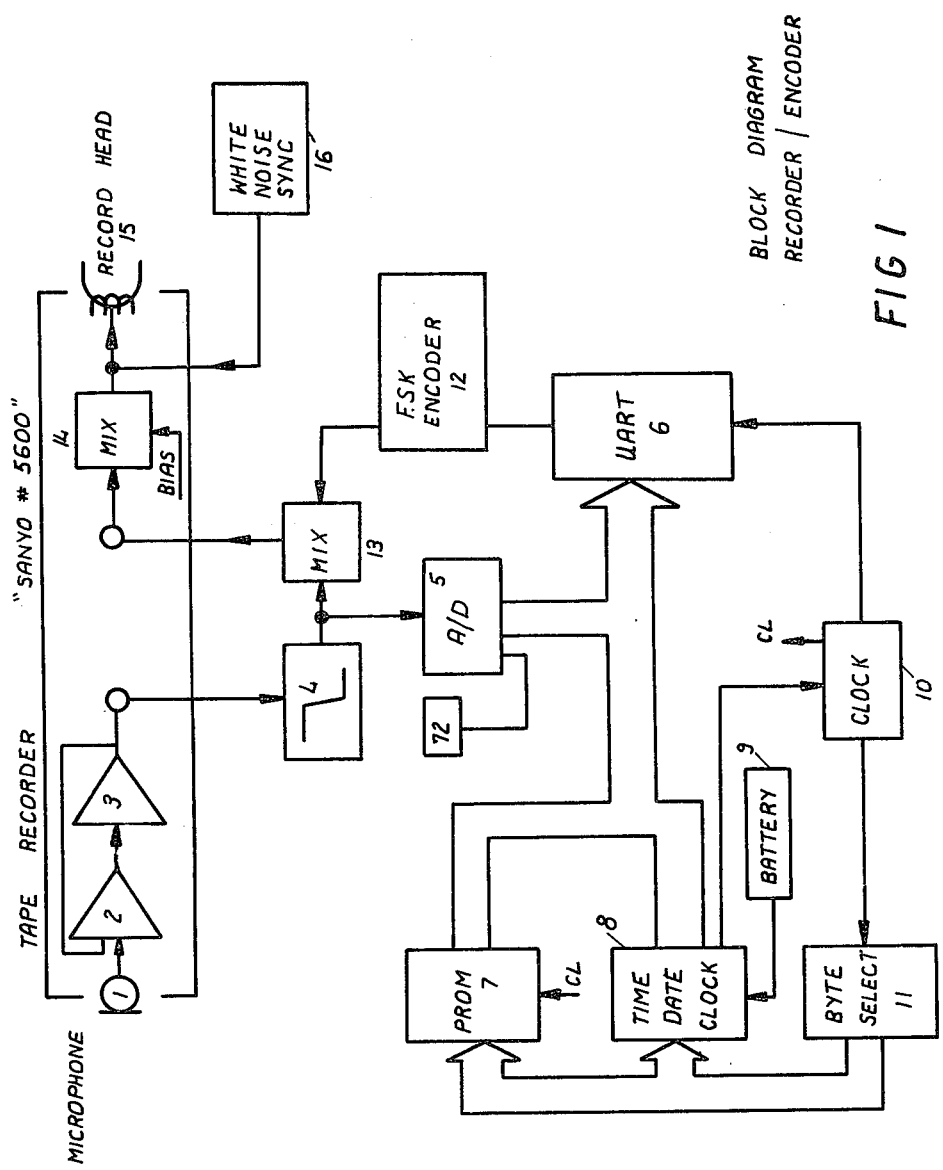
FIG. 1 is a plan schematic diagram of the recorder/encoder of the preferred embodiment.

The apparatus of the preferred embodiment is intended to record voice/analogue information such as conversations with persons interviewed at a first time in a first location such as a police station, the recording then being able to be played back at a subsequent second time at another location such as a Court room or a transcription service. Thus not only must the actual oral message be recorded on the recording medium but also data which may be indicative of the time and place of the recording and data indicative of the integrity of the recorded message itself. In this way a substantial guard against possible forgery, or other tampering with the recording, is provided. The same system can also be utilised for secure recording of other analogue information.

In the preferred embodiment a data signal format is used in which the data signal comprises a series of frames, each of which contains thirty-two characters. These thirty-two characters are allocated to convey certain information as follows; the time of the recording (6 characters), the date of the recording (7 characters), the serial code of the encoder/recorder (12 characters), the status of the battery within the recorder/encoder (1 character), and spare characters to allow for possible future expansion (6 characters).

Furthermore, a further sub-division is made so that for the time information, two characters contain the seconds, two characters contain the minutes and two characters contain the hours; whilst for the date information, two characters indicate the day, two characters indicate the month, two characters indicate the year, and the last character indicates the day of the week.

Each character has a total of eleven bits, three of these bits perform the functions of start, stop and parity check for a serial to parallel converter in the decoder, whilst the remaining eight bits are split into one group of six bits and another group of two bits. The group of six bits carries the data of the character whilst the smaller group of two bits carries digital information indicative of the message information.

Figure 2:
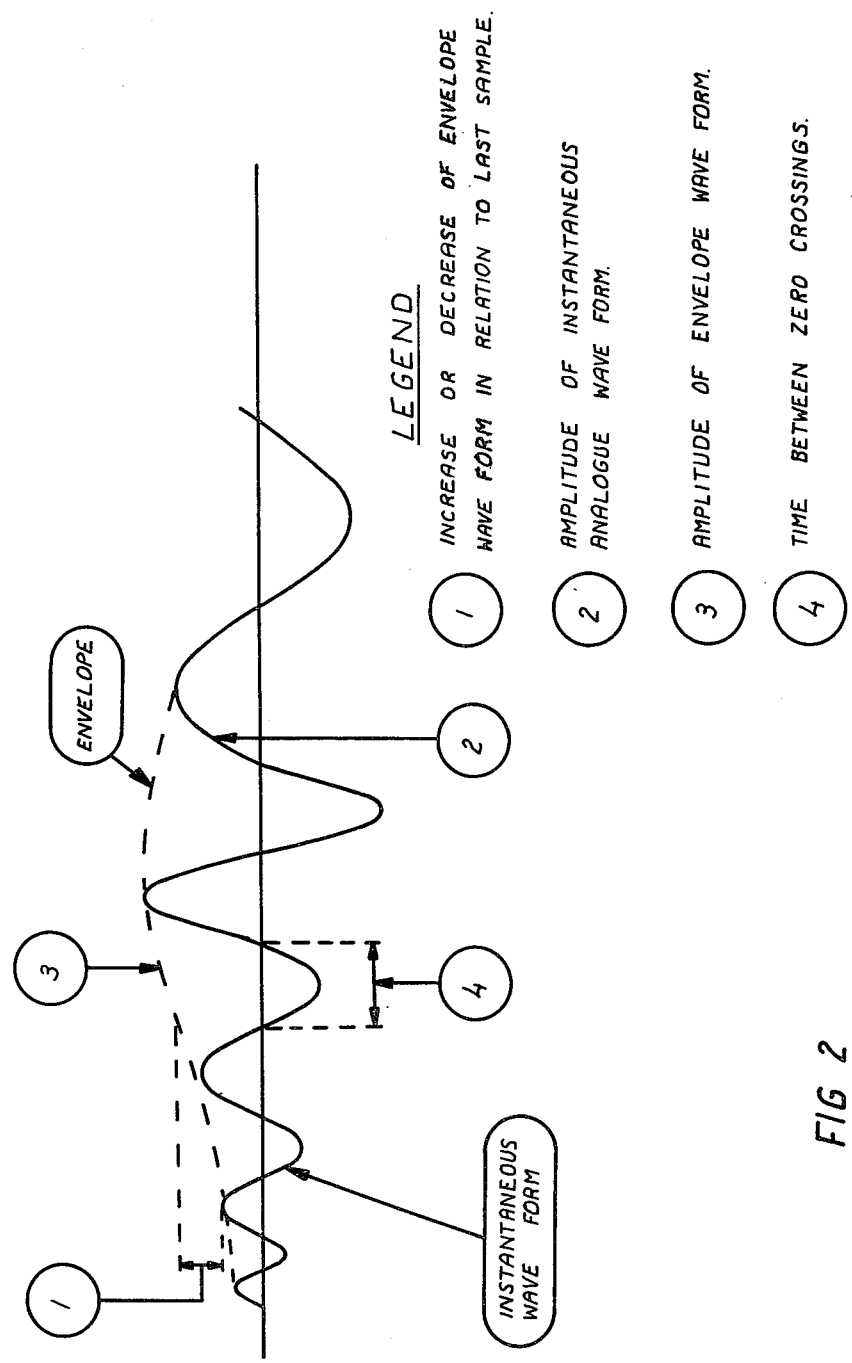
FIG. 2 is a diagram to identify several audio/analogue encoding methods capable of being employed with this invention.

Preferably this digital information consists of the output of a two bit A to D converter which has as its input a form of digital information that represents the message signal. However, clearly this digital representation of the message information can be frequency and/or amplitude dependent. Among possible alternatives, as are shown by FIG. 2, the analogue information or information indicative of the instantaneous content of the message, or information of time between zero crossings of the instantaneous wave form, or the differential between the present status of envelope amplitude compared to previous envelope wave form amplitude, or any combination of these in relation to each other or in relation to a reference in either amplitude or time, is scanned thirty-two times each frame, there being thirty-two characters in the frame. Since there are two frames in a second the envelope information is scanned sixty-four times a second. Future development of this device may vary the scanning rate and the frame rate up or down.

DESCRIPTION OF ENCODER/RECORDER

Preferably, the encoder is housed on or in the same casing as the recorder which in one form may be a "Sanyo #5600" cassette recorder. Referring now to FIG. 1 an audio signal containing the message to be recorded is produced by a microphone 1, or other analogue or digital generator, passed through pre-amps 2 and 3 to a low pass filter 4. The output of the low pass filter 4 is fed to the analogue/digital converter 5 and converted to a digital representation according to one of the methods described in FIG. 2. The output of the analogue/digital converter 5 is placed on the data bus input to the UART 6. In addition also placed on the data bus is information in digital form of serial number provided by the PROM 7 and digital information representing time and date from the clock 8. The time/date clock 8 is kept "alive" when the recorder is switched off by a lithium battery 9. The rate at which the PROM 7 and time/date clock 8 are read is determined by the byte selector 11 which in turn is driven by a clock circuit 10. The clock circuit 10 also provides data clocking for the UART 6. The clock circuit 10 derives its frequency from the time/date clock 8. The output from the UART 6 is fed through the frequency shift keying encoder 12 which converts the serial output data from UART 6 into two frequency representation zeros and ones on frequencies of approximately 4,800 Hz and 5,400 Hz. It should be noted that in a later generation of equipment these frequencies are expected to be closer together and preferably around 4,000 Hz. The output of the FSK encoder 12 is fed to an additive mixing circuit 13 in which the analogue or audio representation of the original message is mixed with the FSK encoded serial data and fed to the bias mixing circuit 14 in the recorder and from there to the record head 15 for recording on magnetic tape.

In addition to the encoder which is providing through the analogue/digital converter 5 already a great amount of security to tampering or forgery or other interference with the tape, a burst of white noise may be fed to the record head as shown by the white noise sync 16. The burst of white noise can be of short but predetermined duration occurring at regular intervals and produced by the noise synchroniser 16 to render any attempt at forgery or other interference even more difficult. In connection with the record head 15 the preferred form of the recoder/encoder may not contain an erase head since it is intended that the contents of the recording constitute an exact record of the sounds detected by the microphone 1 or other analogue/digital input, and therefore no editing is permitted.

Figure 3:
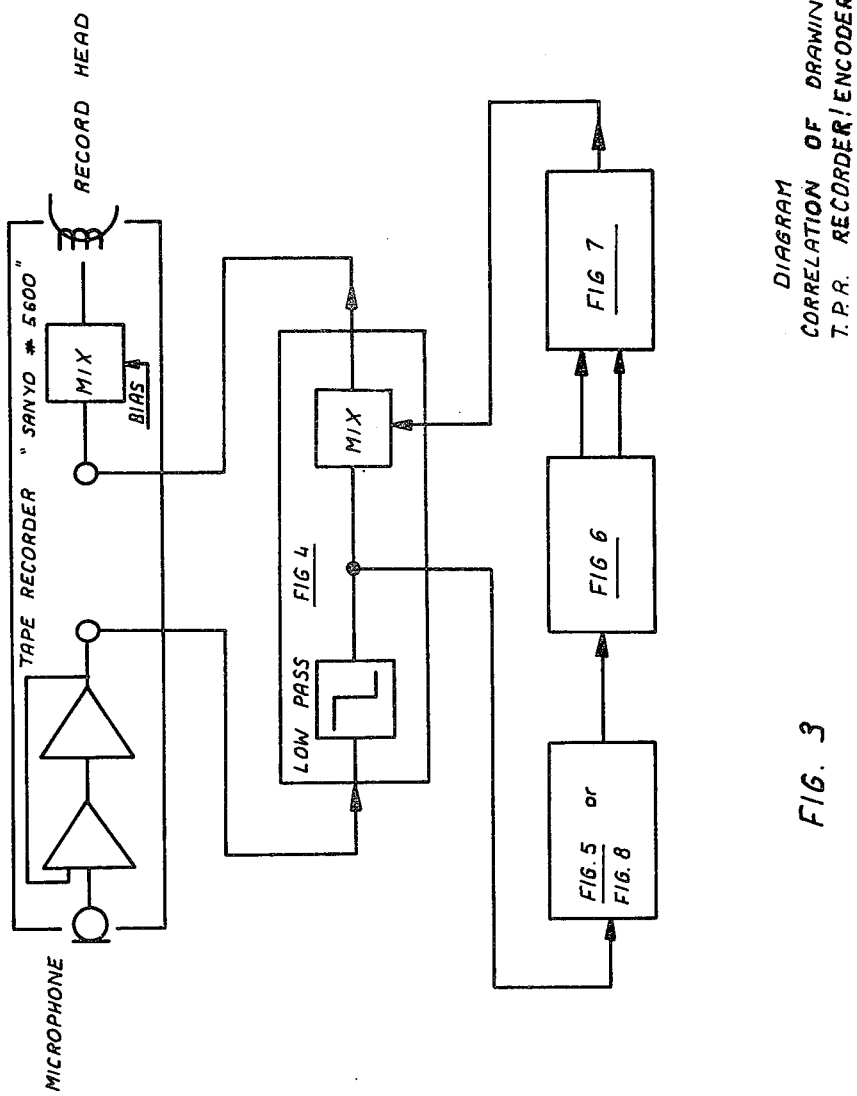
FIG. 3 is a plan schematic diagram providing correlation between the circuit drawings of FIGS. 4 to 8.
Figure 4:
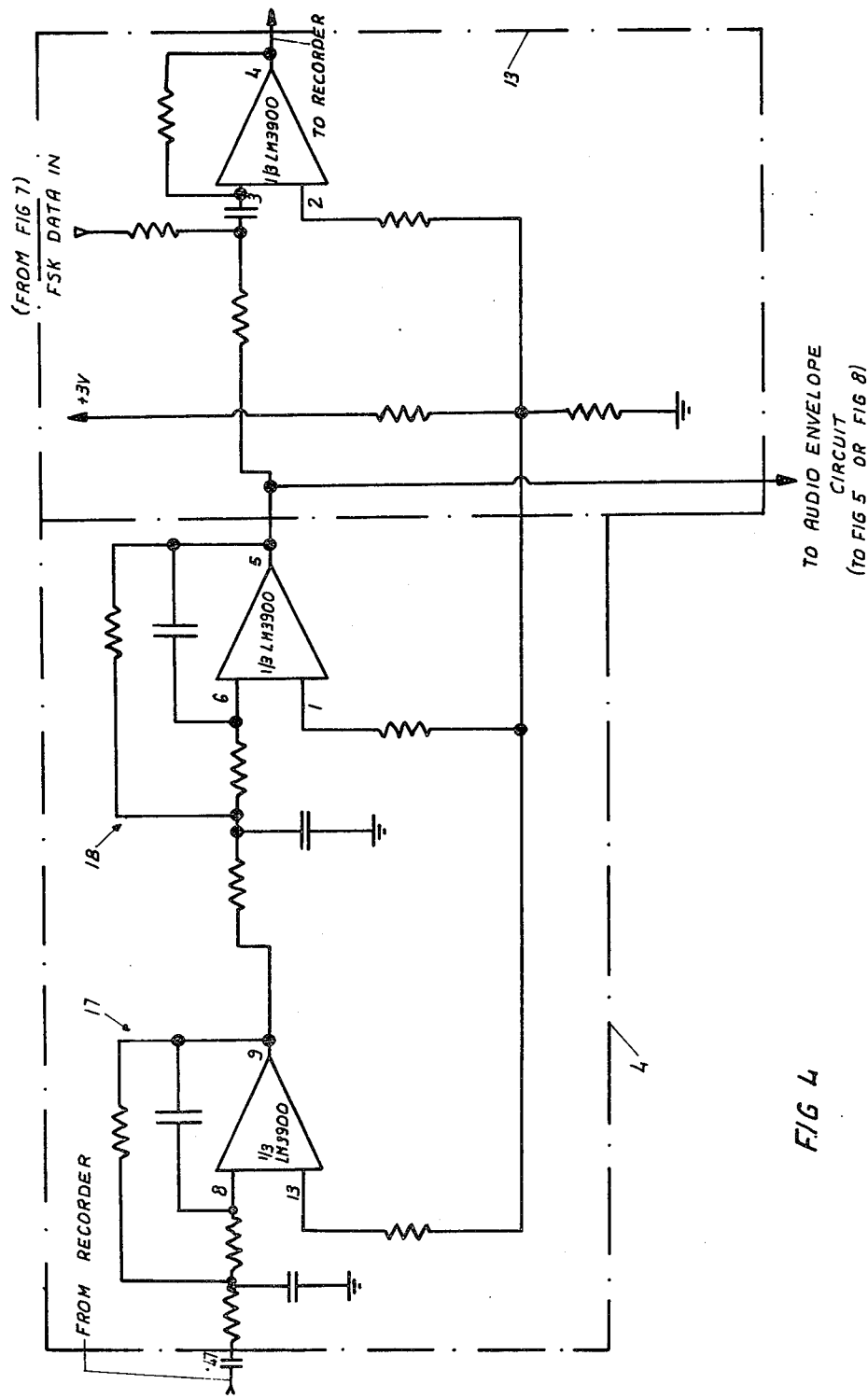
FIG. 4 is a plan schematic block diagram of the low pass filter and mixer of the circuit of FIG. 1.

Details of the individual circuits of the preferred embodiment of the recoder/encoder will now be discussed and the correlation of FIGS. 4 to 8 is shown by FIG. 3. With reference first to FIG. 4 the low pass filter 4 consists of two active filter circuits 17 and 18 providing first and second order low pass filtering with the output of the second order filter 18 being fed to the audio envelope or audio representation converter of FIG. 5 or FIG. 8. The mixer 13 is fed with the original message information after the second order filter 18 as well as the frequency shift keyed data from the FSK encoder 12.

Figure 5:
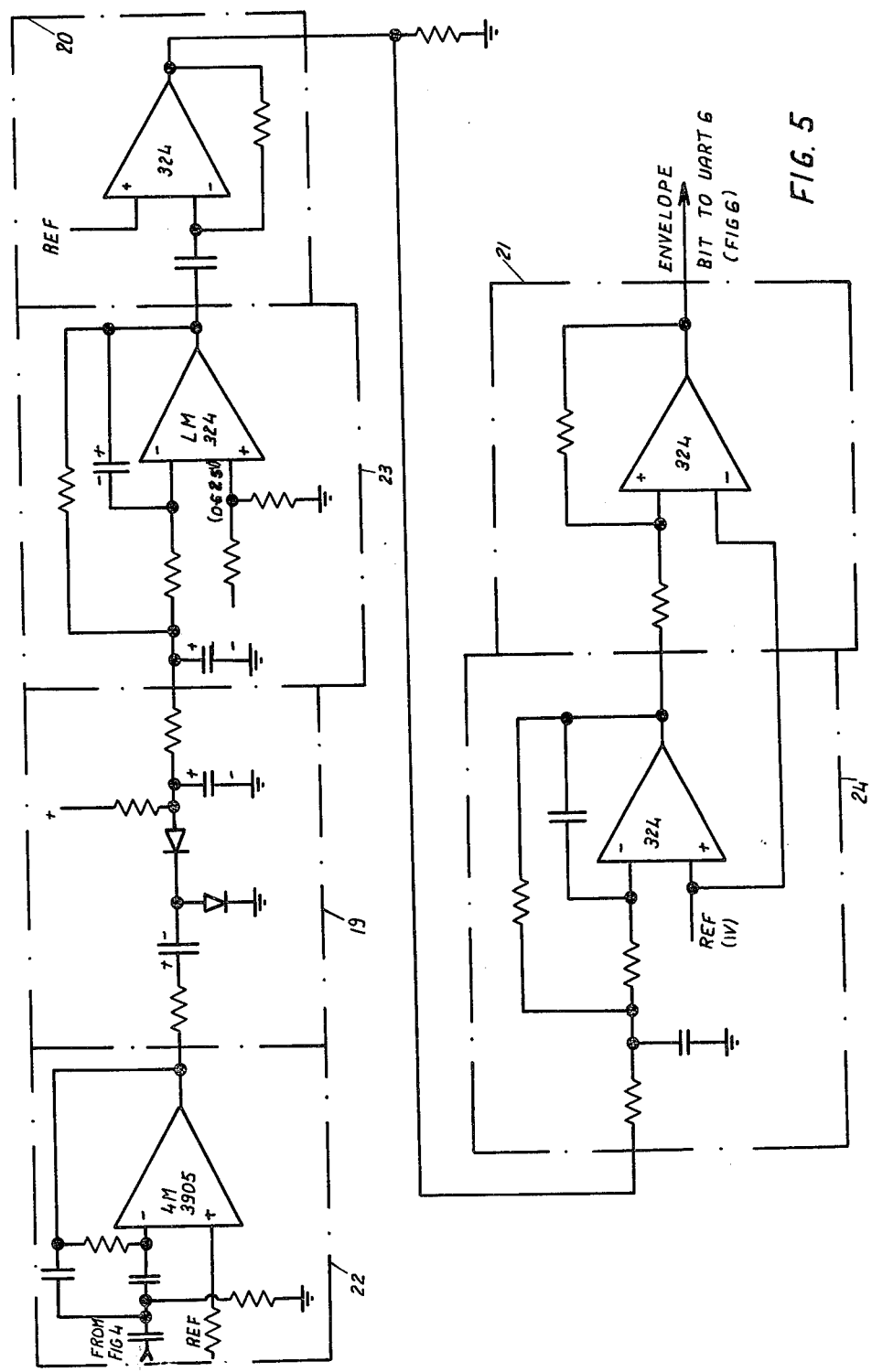
FIG. 5 is a plan schematic block diagram of one form of the audio/analogue encoder thereof.
Figure 8:
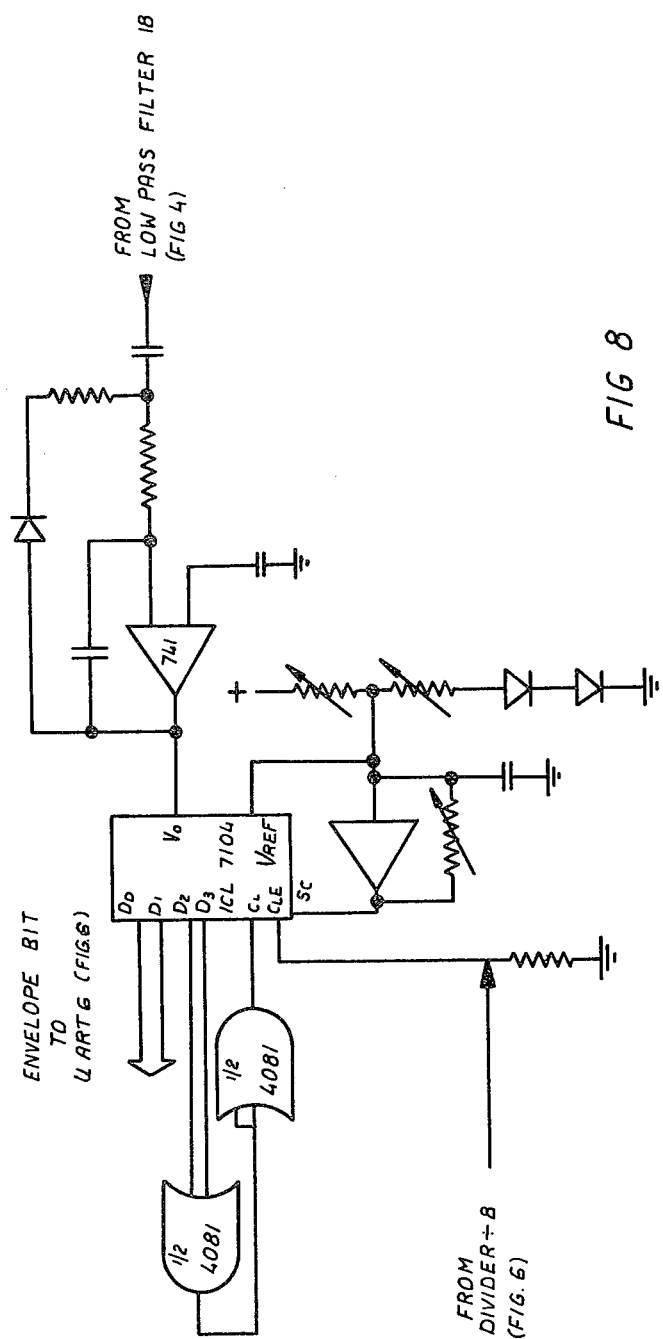
FIG. 8 is a plan schematic block diagram of an alternative form of audio/analogue encoder.

FIG. 5 shows the digital conversion of the representation of the original message. The circuit shown is a preferred embodiment but also shown in FIG. 8 is an alternative which provides instantaneous reading of the audio amplitude. The purpose of the envelope bit in the data stream is to ensure that the data has not been substituted from another recording and more particularly to detect attempts to alter the audio content of a recording independently of the data track. Any attempt to edit the composite audio plus data signal would be detected by the resulting discontinuity of the data stream. One bit has been allocated for this purpose and it essentially serves to record the rhythm of the speech recorded on the tape. Because the recorder is likely to be used in the presence of background noise, the envelope bit is used to represent the slope of the envelope rather than its absolute level. This also minimises errors due to inaccuracies in the gain of the reproducing system which if absolute levels were used, could result in the rejection of a valid recording in the event of a period of sound near the quantising level. As the slope bit represents essentially either 'rising' or 'falling' envelope, errors due to gain discrepancies will occur only toward the start or end of a period of change and can be expected to occur singly and thus be unlikely to result in the rejection of valid recordings.

The preferred embodiment shown in FIG. 5, consists in principle, of a peak signal detector 19 followed by a differentiator 20 and a level detector 21. The output of the level detector 21 is entered as one bit of the serial data stream and effectively is sampled before the start of transmission of each byte of data. Signal filtering is applied before and after peak detection in detector 19 in order to minimise the effect of distortion in the recording and reproducing process. In particular the removal of low audio frequencies by filter 22 prior to detection and the filtering out by filter 23 of all residual audio components in the detected envelope and by filter 24 in the differentiated envelope make the task of matching the encoding and decoding analogue systems easier. As an alternative form where the envelope bit is indicative of the instantaneous value of audio amplitude, the circuit of FIG. 8 may be used.

Figure 6:
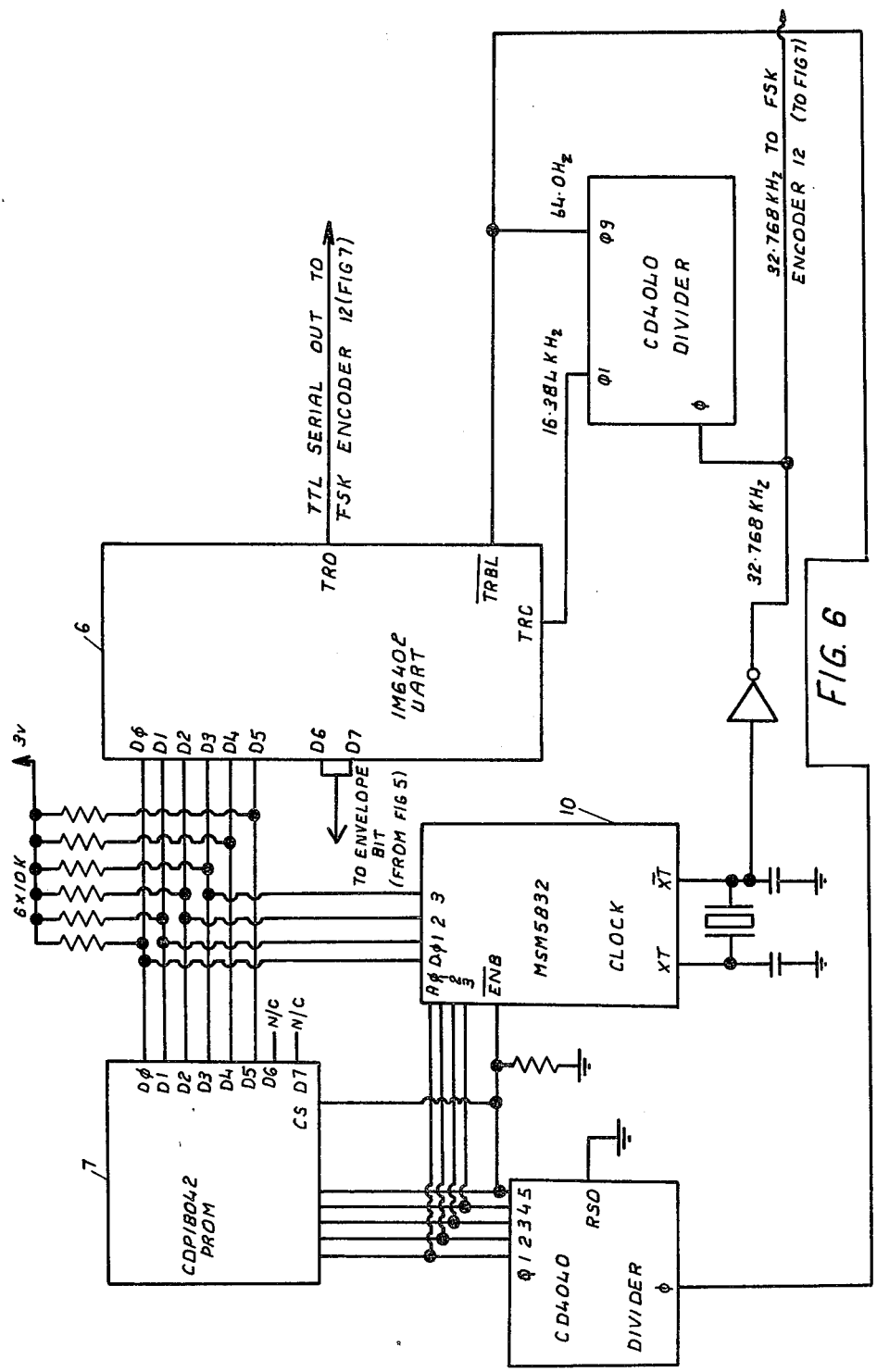
FIG. 6 is a plan schematic block diagram of the data parallel to serial encoder thereof.

FIG. 6 shows the programmable Read Only Memory 7 which is encoded with the unique serial number of the recorder or encoder. It also provides the clock circuit which provides time and date and a byte selector which is driven from the divider. The information selected through the byte selector is put on the data bus and fed to the UART 6 together with the output of the envelope as shown in FIG. 5. The output from the UART 6 is fed to the FSK encoder 12. The data stored in PROM 7 is shown in Table 1 below.

TABLE 1

AREA USED BUT NOT SPECIFIED
DATE OF CREATION (5th Day)
DATE OF CREATION (8th Month)
DATE OF CREATION (1981)
Ascii (P)
Ascii (R)
Ascii (O)
Ascii (T)
Ascii (O)
Ascii (T)
Ascii (Y)
Ascii (P)
Ascii (E)
Ascii (space)
Ascii (3)
Ascii (4)
PROGRAMME VERSION #: 004
TIME ZONE. Eastern Standard
CASSETTE RECORDER STYLE. SANYO TR-5750
RESET WORD E.O.M.

Figure 7:
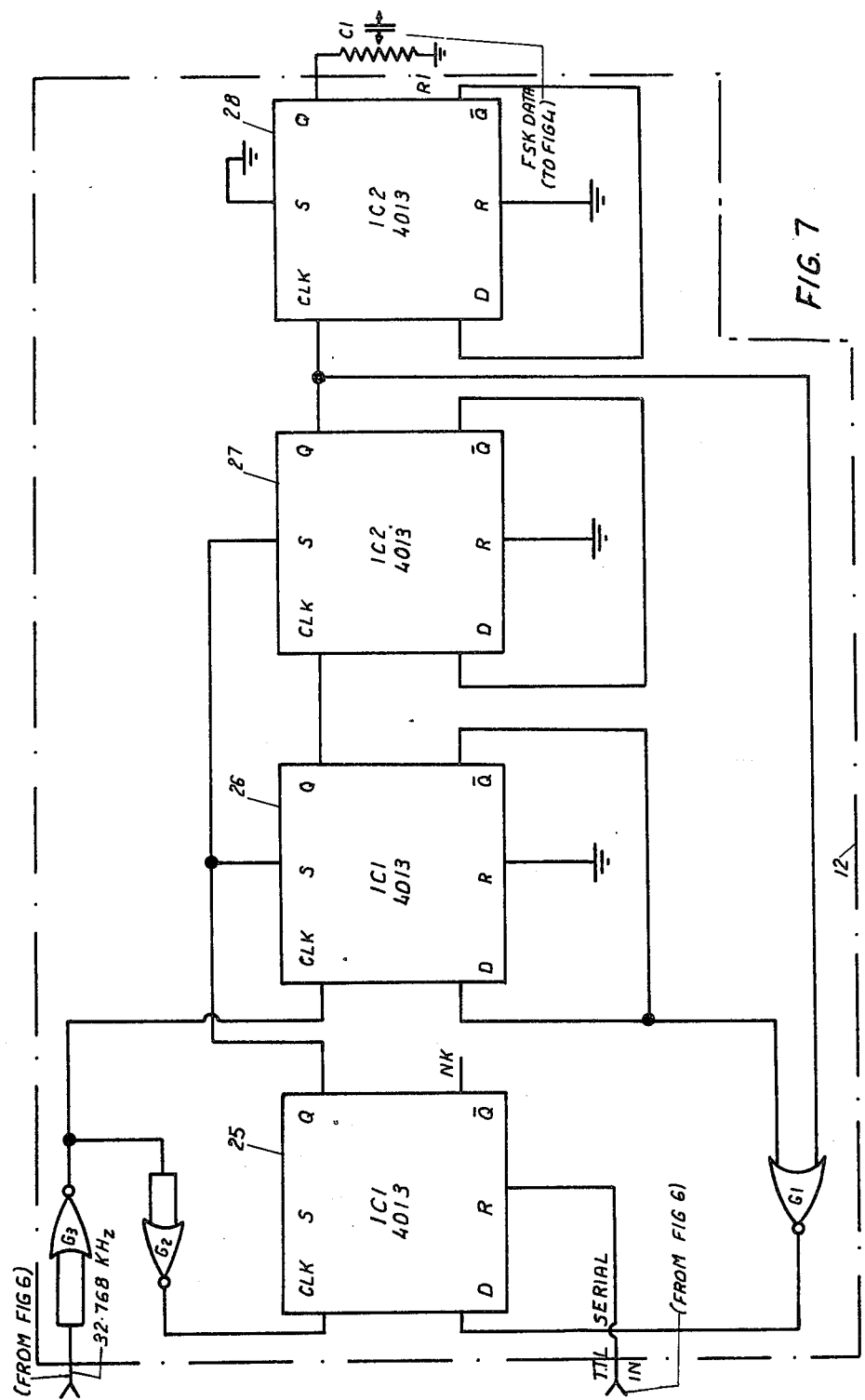
FIG. 7 is a plan schematic block diagram of the FSK encoder.

FIG. 7 shows the FSK encoder 12 which provides the encoding of the digital output from the UART 6 as shown in FIG. 6 through making use of a phase coherent dividing circuit, the divisor being dependent on the digital input to the first flip flop 25. The clocking pulses being derived from the clock circuit 10 on FIG. 6 at 32.768 KHz is divided by three, or four dependent on the digital input, and presents to the last flip flop divider 28 a frequency of either 8191 Hz or 10926 Hz. The last divider brings these frequencies down to either 4095 Hz or 5460 Hz. The output is then fed to a potential divider R1 and a capacitor C1 to feed direct to the mixer 13 of FIG. 4 whose output is passed through the mixer 14 to the record head 15 of the recorder as shown in FIG. 1.

DESCRIPTION OF DECODER/PLAYER

Figure 9:
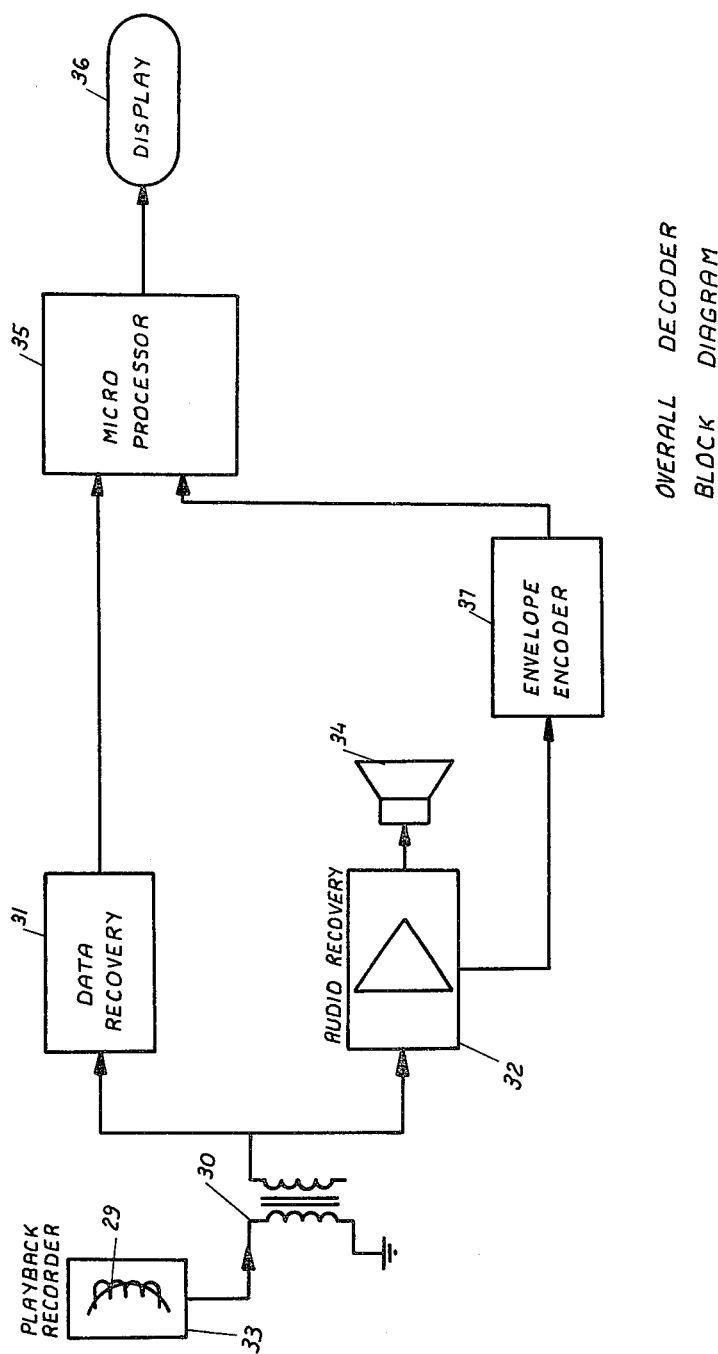
FIG. 9 shows a general layout of the decoder/player of this invention.

When desired a voice message recorded as above may be reproduced at a decoder shown in block diagram in FIG. 9.

It will be apparent that in order to verify the recording produced by the recording head 15, a procedure which is to some extent the reverse of that described above in respect of the recording of speech and data, must be carried out in order to establish the veracity of the recorded message. In the decoder a read only head 29 is provided in order to read the recorded message, the output of the read only head 29 being passed to a transformer 30 and thence to both a data recovery stage 31 and an audio recovery stage 32. The functions performed by the decoder are to divide the incoming audio from a cassette reproducing unit 33 into recovered audio, which is amplified and fed into a loudspeaker 34, and a data stream which is decoded in box 31 and validated in the microprocessor 35, using the known characteristics of data to detect any discontinuities. It also displays on display 36 the date, time and serial number information recovered for identification purposes. A feature of the invention is that a digital representation of the reproduced voice, using a circuit in some ways similar to that shown in FIG. 5 or FIG. 8, is reconstituted at the decoder by unit 37 and applied to the microprocessor 35 for comparison with the reproduced data. The remainder of the data decoder system comprises the single broad microprocessor system 35 which has an asynchronous serial data input port driven by a clock generator at 16 times the data bit rate. The display 36 is a 2×20 character liquid crystal display unit and there are 20 programmable parallel input/output lines, two of which are used to output a byte-synchronising signal and input the recovered bit derived from the audio envelope encoder 37 described in detail hereafter. The microprocessor unit 35 is programmed to examine all of the recovered data looking for significant discontinuities and to compare the envelope characteristics recovered from the reproduced sound with those encoded into the serial data stream.

Figure 10:
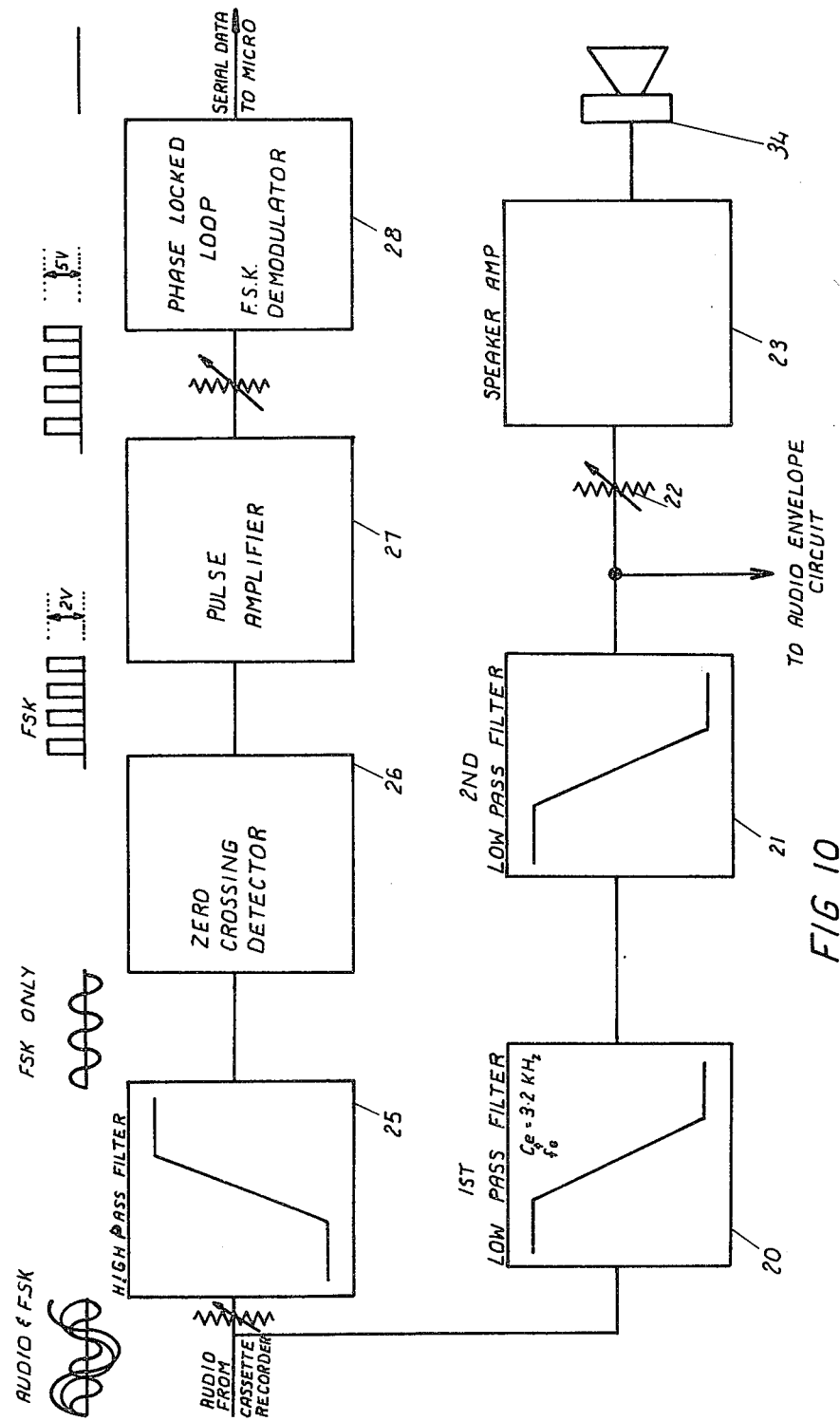
FIG. 10 is a block diagram of the separate sections of the decoder.

With reference to FIG. 10, the replayed signal enters the decoder/playback apparatus and is split between two paths, a low pass filter system 20, 21 for audio recovery and a high pass filter 25 for data. The low pass chain consists of two second-order active filters 20, 21 cutting off at 3.2 KHz. This reduces the frequency-shift-keyed data to a barely audible level. From the low pass filters 20, 21 the signal is fed to the envelope sampling circuit for reconstitution of digital representation of the voice message and also, via a volume control potentiometer 22 to a power amplifier 23 and speaker 34.

The data carrier is separated by means of the second-order high pass filter 25 and fed to a zero-crossing detector 26 and pulse amplifier 27 producing a frequency-shift-keyed pulse train which corresponds closely to that which was recorded on the tape. Decoding is carried out using a phase locked loop 28 which recovers the non-return-to-zero data stream which can be decoded by standard synchronous serial data techniques in a UART type device.

Figure 11:
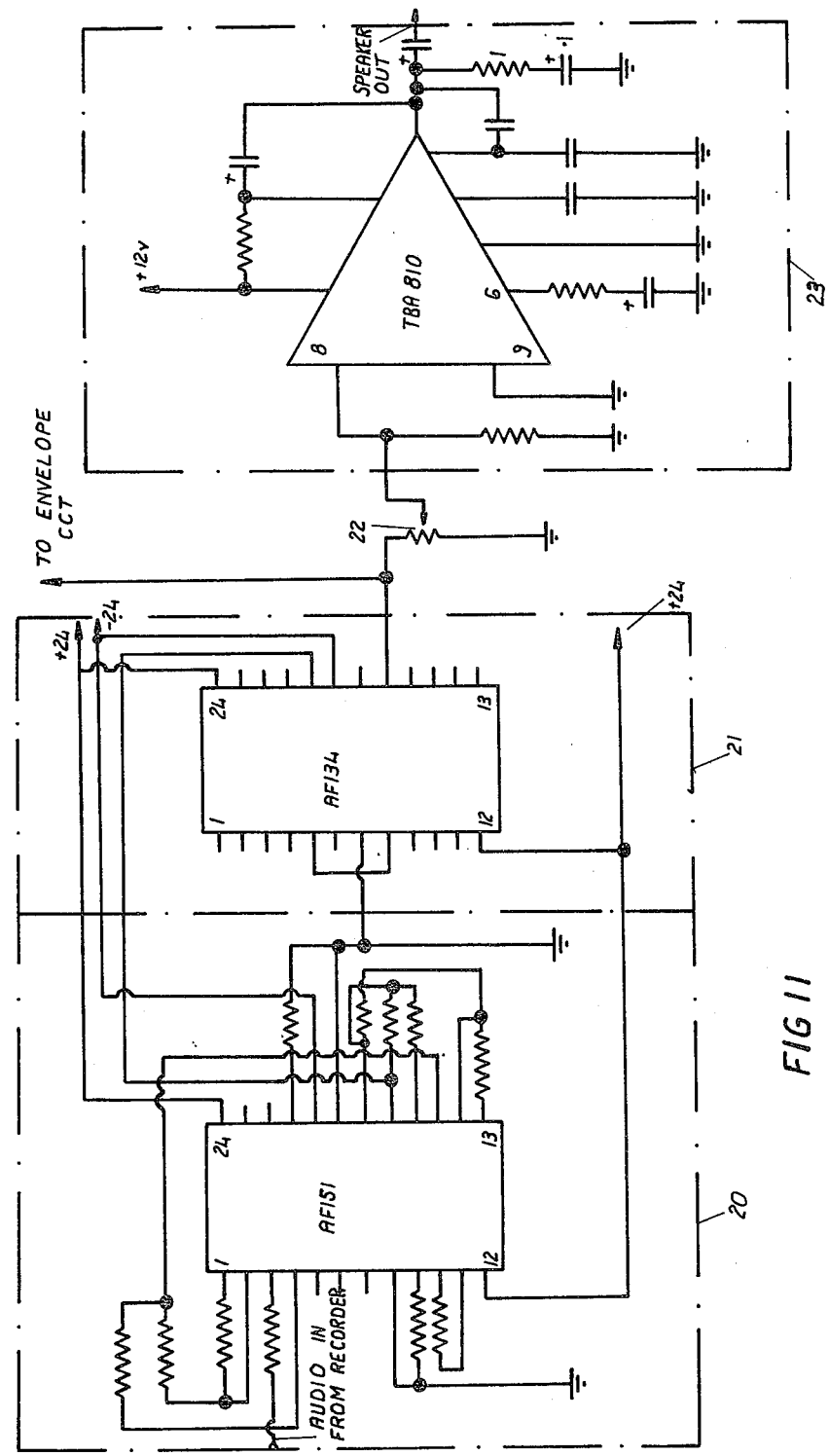
FIG. 11 shows by plan schematic block diagram the audio recovery section of the decoder/player.

FIG. 11 shows in detail the construction of the audio recovery section of the decoder/playback apparatus.

The aim of the audio recovery unit is to insert in the replayed composite audio a very sharp cutoff low pass filter to remove as much of all frequencies above 3200 Hz as is possible. The lower of the two FSK frequencies used is positioned at 4080 Hz and the aim is to have this frequency and all higher suppressed so as to be inaudible on playback.

The first stage 20 is a AF151 which is a non-adjustable speech filter. This gives an attenuation of 19 dB of the lower FSK frequency. The output of this filter is fed directly into the input of a AF134 of stage 21 which is configured as a third order elliptic low pass filter. This gives further attenuation of the FSK content of the audio signal to the point where only the sub-harmonics are audible. The output of the second filter stage is fed both to a potentiometer 22 which acts as a volume control and to the audio envelope circuit to be described hereafter. The controlled output of the potentiometer 22 is fed to a TBA810 amplifier and thence to the speaker 34 (FIGS. 9 and 10).

Figure 12:
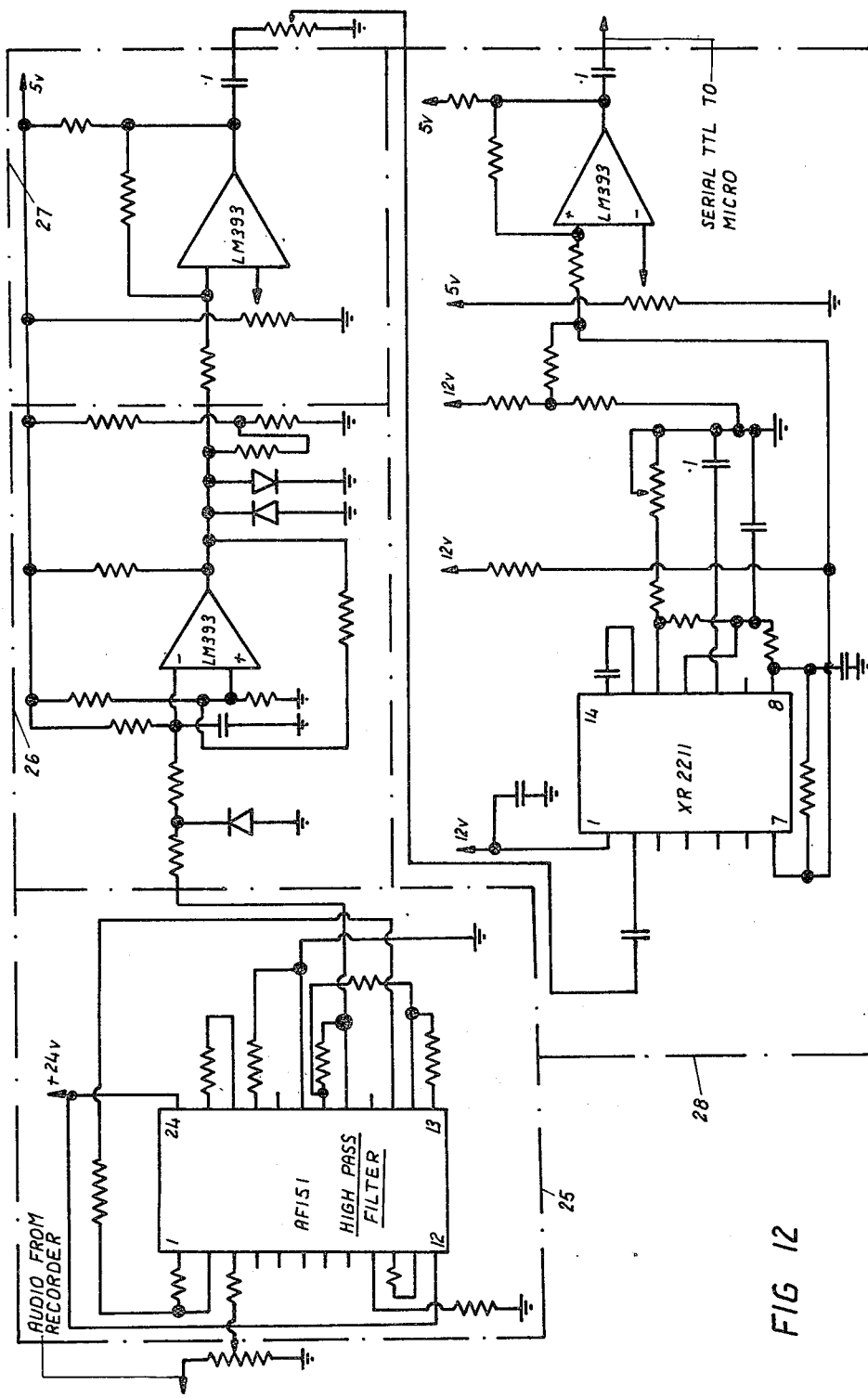
FIG. 12 shows by schematic diagram the data recovery section thereof.

The data recovery section of the decoder/playback apparatus is shown in detail by FIG. 12.

The composite audio/data is transformer coupled into an AF151 hybrid filter configured as a third order elliptic high pass filter 25. The purpose of this filter is to remove the previously band limited (i.e. 30–3200 Hz) audio from the data FSK signal at 4080 Hz and above. The output of the AF151 is fed to an LM393 comparator with the first stage configured as a zero crossing detector 26. This detector gives a square wave output which represents the frequency of the FSK input and is independent of the varying input amplitude. The output of the first LM393 section 26 is fed to the second section 27 configured as a pulse amplifier. This stage amplifies the square wave output of the zero crossing detector 26 from about 200 Mv P-P to 5 V P-P. The output of the pulse amplifier 27 is fed to the input of an XR221 phase locked loop FSK decoder 28. The circuit used here is as per the X-R data sheet and the output is fed to another pulse amplifier (¼ LM393) which ensures that the output is TTL compatible (i.e. 0–5 V).

Figure 13:
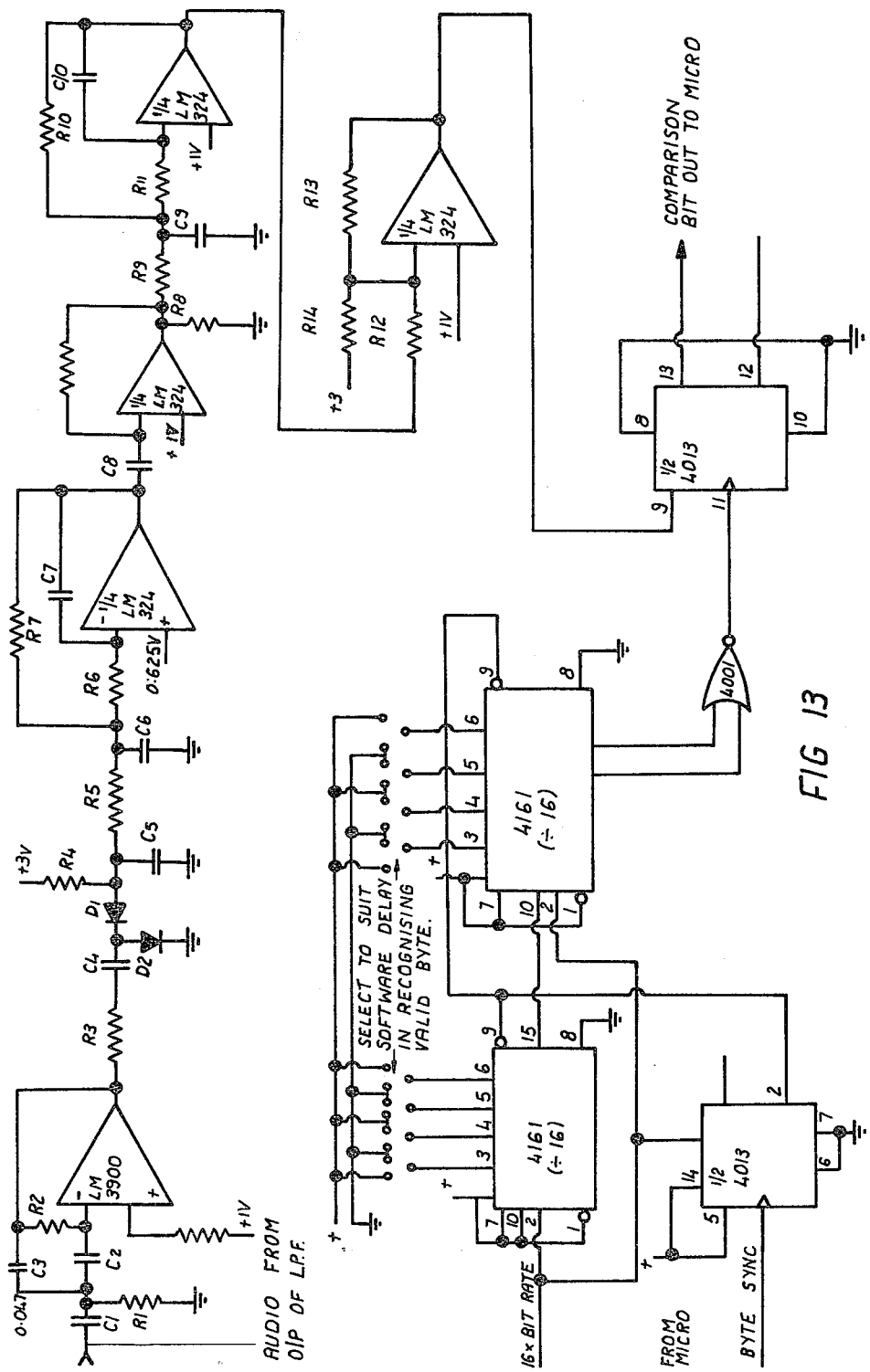
FIG. 13 is a plan schematic block diagram of the envelope bit encoder thereof.

The reconstituted digital representation of the reproduced voice referred to above, is obtained by means of an envelope bit generator circuit as shown in FIG. 13.

This circuit, which is quite similar to the circuit of FIG. 5, operates as follows. The audio signal as recovered from the low-pass filters 20, 21 (FIG. 10) in the audio section of the decoder enters a high pass active filter built around an operational amplifier, which is shown as a section of an LM393, its cutoff frequency which is tentatively set at 180 Hz being determined by the capacitors C1, C2 and C3 resistors R1 and R2. As the purpose of the filter is to attenuate components at frequencies which may be reproduced inaccurately by the cassette recorder system, the cutoff frequency will require to be optimised to suit the tape medium and speed ultimately used.

From the high-pass filter, which has a low output impedance, the signal passes to a peak rectifier comprising resistors, capacitors C4 and C5 and resistors R4. The quiescent bias point is determined by the forward voltage drop across the two diodes D1 and D2 and this reduces in the presence of an input signal. The attack and decay times of the detector are determined by resistors R3 and R4 respectively. An active low pass filter follows which is designed to remove envelope components at the audio frequency while providing some gain to the envelope signal. It is tuned to approximately 30 Hz using capacitors C6 and C7 and resistors R5, R6 and R7 with a section of an LM324 operational amplifier package as the active element.

An active differentiator follows, made up from a coupling capacitor C8 and an operational amplifier section with resistive feedback to form a virtual earth input. The LM324 section used is assisted by load resistor R8 to ground in order to improve circuit linearity. The differentiated envelope is again low pass filtered in an active filter, cutting off at 30 Hz to further diminish the signal-related components. The filter comprises the next amplifier section, resistors R9, R10, and R11 and capacitors C9 and C10 and its output feeds the final section of the LM324 acting as a level detector with some hysteresis induced by resistor R12 and positive feedback resistor R13. The detector is biased towards the "Increasing Envelope" state by a pullup resistor R14 which should be adjusted to provide a standard threshold sensitivity. An alternative approach to biasing here is to feed the reference input of the operational amplifier from an adjustable voltage source which should be adjusted on testing to give a standard response.

In the decoder, sampling is more complex than in the encoder, in that the appropriate sampling time must be determined from the timing of the received characters, which is initiated by the microprocessor unit which puts out a timing pulse once it has determined that a received character is a valid one. The timing pulse feeds a D flip-flop and sets it enabling the load function in two 4161 counters. The counters provide a division by 256 from the clock at 16 times the serial bit rate which is used to decode the recovered serial data within the microprocessor system. The flip-flop is reset by the clock pulse. The load inputs to the counters are set up to match the combined delays of receiving a byte and determining in software its validity, resulting in a count which is synchronised to the serial data and from which, using a section of a 4001 gate package, a pulse is generated, the leading edge of which is used to strobe the digital information from the envelope bit circuit into a second D flip-flop which is part of the same 4013 package used to generate the load pulse. In order to match this envelope bit generator to its encoder counterpart, the same supply voltage is used and this results in the need to use an additional level detector as a level shifter to match the output bit into the 4013 D flip-flop.

An essential feature of the envelope bit generation is that the encoder and decoder units' performance characteristics must be very closely matched and this requires the use of close tolerance resistors and capacitors. If this not be done, the natural error rate due to mismatch can be such as to diminish the sensitivity of the system to errors caused by tampering with the audio component of the recorded information.

The asynchronous +5 V TTL signal (FIG. 12) is fed directly into a 6850 ACIA'S serial input. the signal format is:
1 Start Bit
8 Data Bits
1 Parity Bit
1 Stop Bit These 11 bits are being transmitted serially at 1024 bits per second. When the ACIA receives all eleven bits of a character with no frame, parity or over-run errors it is handed into the software package of the decoder and an interrupt signal is fired. To allow the ACIA to operate at a rate of 1024 bits per second, a frequency of 16 times the bit rate must be supplied to the ACIA. This is achieved by using a crystal oscillator running at 32768 Hz and dividing the output of the oscillator by two. The oscillator and divider is on a sub-board attached to the MPU BOARD. An LM393 is used as the crystal oscillator utilising a standard circuit as per national semi-conductor data sheet LM393. The frequency division is achieved by using a 4013 again in a standard application note configuration. The output of the divider is fed into pin 3 of the 6850 ACIA (Receive Clock In).

The display 36 (FIG. 9) is an intelligent 5×7 thirty-two character Dot Matrix Display. The display is fed with a serial Dot Information Raster. To get this raster scan, a dedicated four bit CMOS microprocessor is fed with a seven bit ASCII (parallel) word. The microprocessor is fed from a spare 2708 E PROM socket on the 6800 D1 board and so the display is actually treated as two separate memory locations, one for writing to the display and one for reading the ready bits. The four bit micro is mounted on a PC board intercepting a twenty-four way ribbon cable to the display from the 2708 socket. The display is self sufficient and needs no extra clocks or P/S lines. The display used is an IEE 3822-93-032 and the controller chip 44958-01.

| COMPONENT | USE | MANUFACTURER |
|---|---|---|
| CHIP COMPLEMENT FOR ENCODER | | |
| IM6402 | U.A.R.T. 6 | Intersil |
| CDP18U42 | E. PROM | RCA |
| MSM5832 | REAL TIME CLOCK | OKI |
| 4013 | FSK GENERATOR | Fairchild |
| 4040 | CLOCK DIVIDER | Motorola |
| 4040 | COUNTER | Motorola |
| LM3900 | LOW PASS FILTER | National |
| LM324 | ENVELOPE BIT GENERATOR | National |
| DECODER DATA RECOVERY | | |
| AF151 | LOW PASS FILTER | National |
| LM393 | ZERO CROSSING DETECTOR | National |
| LM393 | PULSE AMPLIFIER | National |
| XR2211 | PHASE LOCKED LOOP FSK DECODER | EXAR |
| AF151 | LOW PASS FILTER | National |
| AF134 | LOW PASS FILTER | National |
| TBA810 | AUDIO AMPLIFIER | SGS-AGES |
| ENVELOPE BIT/DECODER SECTION | | |
| LM3900 | AUDIO LOW PASS FILTER | National |
| LM324 | ENVELOPE BIT | National |
| 4013 | FLIP-FLOP | Motorola |
| 4161 4161 | COUNTERS | Motorola |
| 4001 | GATE | Motorola |

OPTIONAL ACCESSORIES

Optionally, as referred to above, a white noise generator is used to supply synchronised bursts of white noise which are recorded onto the magnetic tape or other record medium should, in some circumstances, a further security check be desired.

The noise synchronizer 16 (FIG. 1) will generate a short burst of white noise at a regular rate, say every 16 seconds. This white noise has a frequency spectrum which extends into the audio range and thus this portion of the white noise burst cannot be filtered from the audio signal. The white noise burst produces a hiss (as opposed to a beep) and produces an audible sensation similar to the beeps superimposed on telephone conversations that are broadcast via commercial radio, for example.

Any attempt to tamper with the tape would require that white noise bursts of identical duration and pulse repetition rate be superimposed upon the edited audio signal exactly in synchronization with the originally recorded bursts—a substantially impossible task. Any attempt at this task is more likely to result in two services of pulses (and hence two series of hisses), longer hisses, or a change in the rate of occurrence of hisses. These defective results are easily detected by the human ear.

By the use of a specific housing for the record medium on which an interview has been recorded, a plastics cassette for magnetic tape is provided with a means of permanently recording a finger print of the interviewee. If desired the interviewer can also have his finger print recorded.

Figure 14:
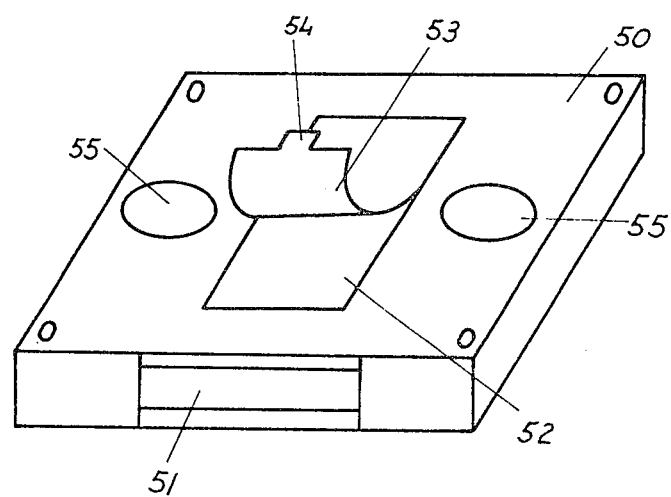
FIG. 14 is a perspective view of a magnetic tape cassette of a first preferred embodiment.

The cassette 50 as seen in FIG. 14 contains a length of magnetic tape 51 extending between two reels 55. The upper surface of the cassette 50 has a layer 52 of finger print recording substance which is covered by a peel-off layer 53 having a lifting tab 54. At the end of the interview (or the end of the tape 51 contained on the cassette 50) the layer 53 is peeled back and the interviewees finger (e.g. right thumb) used to create a finger print on the layer 52. The finger print recording substance can be any one or more of a number of substances such as photo-resist used in the production of integrated circuits or epoxy-resin. In the former case the layer 53 is opaque to the ultra-violet light which polymerises the photo-resist thereby setting same to permanently record the finger print. In the latter case the layer 53 excludes oxygen which is required to oxidize a substance in the epoxy-resin which, when oxidized, acts as a curing agent. Again the finger print is permanently recorded in a very short time. Similar substances which cure or set on exposed to white or ultra-violet light, or air, will be known to persons skilled in the chemical art.

Figure 15:
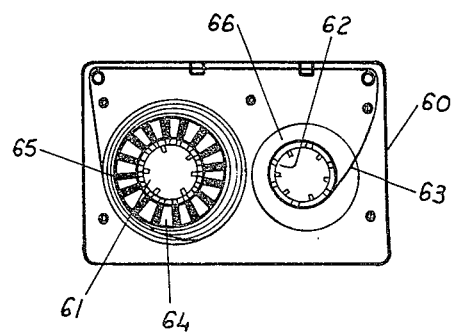
FIG. 15 is a plan view of a magnetic tape cassette of a second embodiment.

In some instances it may be desirable to verify the location in a magnetic tape, for example, at which a particular piece of information data was recorded. This desirable end can be achieved with the apparatus of FIGS. 15 and 16. As seen in FIG. 15, a "mini-cassette" or housing 60 carries two spools 61 and 62 on which a length of magnetic tape 63 is coiled or wound. As seen in FIG. 15, the upper face of spool 61 carries an annular card 64 which is provided with a plurality of alternatively black and white radially extending markings 65. The (underside) of spool 62 is provided with an identical card 66. At least some portion of the housing 60, and preferably the entire housing 60, is transparent so that a portion of card 64 can be viewed from the upper surface of the housing 60 (as shown in FIG. 15) and at least a portion of the underside of the card 66 is able to be viewed from the underside of the cassette housing 60.

It will be appreciated that as information is recorded on the magnetic tape 63, that portion of the magnetic tape 63 which is held by spool 61 is progressively transferred to spool 62. Accordingly, at the "beginning" of the tape 63, spool 62 rotates rapidly whilst spool 61 rotates relatively slowly. As the unwinding of tape 63 from spool 61 progresses, spool 62 progressively decreases in rotational speed, whilst spool 61 increases in rotational speed. This is necessary in order to permit a constant speed of the tape 63 past the recording heads (not illustrated).

Figure 16:
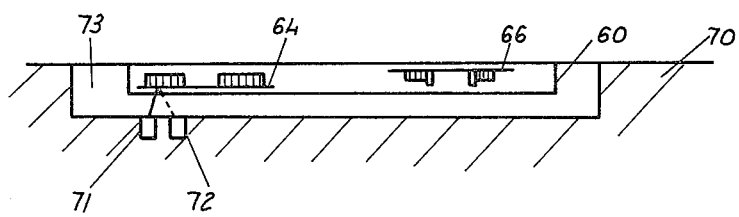
FIG. 16 is a cross-sectional view of a recorder having optical sensing apparatus suitable for use with the cassette of FIG. 15.

As seen in FIG. 16, a tape recorder 70 having a light source 71 and light detector 72 located in its cassette receiving bay 73, is able to receive the cassette 60 of FIG. 15 so that the card 64 is immediately confronting both the light source 71 and light detector 72. It will be apparent that if the cassette 60 were reversed, then the card 66 would be confronting the light source 71 and light detector 72.

The light source 71 preferably comprises a light emitting diode (LED) and the light detector 72 preferably comprises a photo-transistor. As card 64 rotates, the light emitted by light source 71 is either reflected, or not reflected, by the markings 65 on the card 64. Accordingly, a series of light pulses is received by the light detector 72, the rate of the pulses being determined by the speed of rotation of the card 64 and hence spool 61.

It is therefore apparent that the frequency of the output of the light detector 72 is a direct measure of the speed of rotation of the spool 61 and hence the location of that portion of the tape 63 being transferred between the two spools 61 and 62 and, therefore, passing under the recording heads.

As shown in FIG. 1, the output from the light detector 72 may be passed to the A to D convertor 5 in order to comprise part of the information to be recorded on the tape 63. Thus the output of the light detector 72 utilizes some of the six spare characters referred to in the previous discussion relating to the data signal format. It will be apparent that the output of the light detector 72 provides a direct measure of the position on the tape 63 at which the actual recording took place. Thus, if the subsequent analysis of a tape recording, it transpires that the location on the actual tape at which the output from light detector 72 is recorded, does not correspond with the actual recorded light detector output, then it will be apparent that the tape concerned is a forgery. As a consequence the arrangement of FIGS. 15 and 16 provides a further complication to a forger who must ensure a correspondence in tape position for any inserted or amended material.

The light source 71 and light detector 72 can also serve two other functions, if desired. The first of these functions is to replace the existing movement sensor provided in many tape recorders for the activation inter alia, of a tape position indicator. This indicator normally takes the form of a mechanical counter, the display value of which indicates the position or location of that portion of the tape presently passing underneath the recording heads. Since the frequency of the output of the light detector 72 is directly related to the speed of rotation of the corresponding spool, the position of the tape may be indicated directly by use of the output of the light detector 72.

In addition, because the frequency of output of light detector 72 should not change significantly during short periods of time, this output can also be used to provide a servo-control system for the recorder motor in order to reduce wow and flutter in the tape recorder. A further advantage of the cards 64 and 66 and the light source 71 and light detector 72 in that the recorder 70 can easily be made inoperative in the absence of any output from light detector 72. This ensures that only cassettes 60 including cards 64 and 66 can be used with the recorder 70. If the cassettes 60 are not available for general use and are supplied only by a specific manufacturer, this makes it harder for a would be forger to obtain basic materials with which to work.

The foregoing describes only some embodiments of the present invention and modifications, obvious to those skilled in the art, can be made thereto without departing from the scope of the present invention.

For example, the head 15 can be a read/write head so that the nature of the magnetic tape, for example, upon which the message is to be recorded can be ascertained. Thus, a Schmitt trigger circuit can be used to check that the tape has not previously been used and that there is no other audio or other information pre-existing on the tape. If this test is not passed satisfactorily, the resulting signal from the Schmitt trigger can be used to disable the remainder of the encoder.

Similarly, in order to ensure that the recording medium is of sufficient quality for archival use, the manufacturer's encoding placed on the tape, or other medium, at the time of its manufacture can be sensed and a nil output can be used to disable the encoder. Furthermore, the signal processing philosophy behind the present invention will be apparent from the above described arrangement and it will be apparent to those skilled in the art that the encoder/recorder and decoder/player of the present invention may be realised using circuits other than those described above.

It will also be apparent to those skilled in the art that the above described arrangement offers many advantages in that the time coding and envelope information, together with the actual message are all recorded onto a single track and thus the possibility of splitting one track from a tape away from the remainder of the tape is avoided. Furthermore, because there are five frames to a second and the second data is the most frequently changing item of time data, each group of five frames carries the same data giving excellent reliability and immunity from noise.

We claim:

1. A recording/reproduction system for recording in a recorder and on a record medium analogue signals representive of an original audio message and a first data stream, and for reproducing subsequently in a reproducer and from said record medium the signals representative of the audio message and the data stream, and effecting playback of the audio message and indicating whether said playback is an authentic representation of said original audio message, said system being characterised in that said first data stream is representative of the periodic instantaneous content of a parameter of said original audio message signals, a comparison is made between said first data stream and a second data stream generated in said reproducer and representative of the periodic instantaneous content of said parameter of said reproduced audio mesage signals, and as indication is provided from said comparison as to whether said reproduced audio message is an authentic reproduction of said original audio message.

2. A system as claimed in claim 1, wherein said first and said second data streams each contain digital information composed of 2 bits representative of the respective audio message.

3. A system as claimed in claim 1 or 2, wherein said first data stream also contains digital information representative of the real time and date of the recording, and means at said reproducer resolves said digital information and displays thereat the time and date at which the reproduced audio message was recorded.

4. A system as claimed in claim 3, wherein parity means at said reproducer produces an indication whenever an interruption occurs in the digital information representative of the time and date.

5. A system as claimed in claim 1 wherein said first data signal comprises a series of frames each of which contains thirty two characters allocated as follow:
6 characters—time of the recording
7 characters—date of the recording
12 characters—the serial code of the recorder
7 characters—spare for additional use,
and each character has a total of eleven bits, three of which perform the functions of start, stop and parity check for a serial to parallel converter in the decoder, six of which carry the data of the character and two bits carry the digital information representative of the periodic instantaneous content of said parameter of said original audio message.

6. A system as claimed in claim 1 wherein said parameter of said original audio message signal is the differential between the envelope amplitude at any instant and the amplitude thereof at an earlier instant.

7. A system as claimed in claim 1 wherein said parameter of said original audio message signals is the instantaneous value of the envelope amplitude.

8. A system as claimed in claim 1, wherein the original audio message signal in analogue form is recorded on the record medium after being mixed with said first data stream which has been converted into frequency representation zeros and ones on respective frequencies in the audio range.

9. A method of recording an original audio message and of subsequently reproducing said message while indicating the authenticity of said reproduction, said method comprising the steps of converting said original audio message to a first analogue electrical message signal, generating first message information dependent on the instantaneous content of said first electrical message signal, forming a digital data signal from said first message information; recording said analogue and digital signals on a record medium; reproducing from said record medium a second electrical message signal and said data signal, generating second message information dependent on the instantaneous content of said second message signal; making a comparison between said second message information and the message information contained in said data signal and providing an indication whenever said comparison reveals lack of parity.

10. Apparatus for reproducing an original audio message which has been recorded on a magnetic tape as an analogue signal together with a first data stream indicative of instantaneous values of a parameter of said audio message at the time of recording said message, said apparatus comprising an audio section for playback of said audio message, encoding means responding to said audio message to produce a second data stream indicative of instantaneous values of said parameter of said audio message, means for comparing said second data stream with said first data stream, and means for generating a signal upon the occurrence of lack of parity between said first and said second data streams, whereby the absence of said signal indicates authentic reproduction of the original audio message.

11. Apparatus as claimed in claim 10, wherein said first data stream also contains digital information representative of the real time and date of the recording, and means is provided to resolve said digital information and display the time and date at which the original audio message was recorded.

12. Apparatus as claimed in claim 11, comprising also parity responsive means for producing an indication whenever an interruption occurs in the digital information contained in the separated first data stream and which is representative of said time and date.

13. Apparatus as claimed in any one of claims 10 to 12, further comprising means for timing said production of said data stream to synchronise with said first data stream separated from said composite signal.

14. Apparatus for recording upon a record medium an original audio message and a signal for subsequent use in a reproducer to establish whether the audio message reproduced from said record medium is an authentic reproduction of said original audio message, said apparatus comprising transducer means for converting said original audio message to an electrical analogue signal, sampling means deriving from said analogue signal a digital data signal, in two data bits, representative of periodic instantaneous values of a parameter of said analogue signal and a recording head for recording said analogue and digital signals on said record medium.

15. Apparatus as claimed in claim 14, wherein said parameter of said analogue signal is the differential between the envelope amplitude at any instant and the amplitude thereof at an earlier instant.

16. Apparatus as claimed in claim 14, wherein said parameter is the instantaneous value of the audio amplitude.

17. Apparatus as claimed in any one of claims 14 to 16, comprising also a frequency shift keying encoder to convert the data signal into two frequency representation zeros and ones on respective frequencies disposed within the audio range, and said mixer means subsequently effects mixing of said analogue signal with said audio representation of said data signal to form said composite signal.

18. A method of recording upon a record medium an original audio message and a signal for subsequent use in a reproducer to establish whether the audio message reproduced from said record medium is an authentic reproduction of said original audio message, said method comprising the steps of converting said original audio message to a first electrical analogue signal, deriving from said first analogue signal a two bit data signal representative of periodic instantaneous values of a parameter of said first analogue signal, converting said data signal to a second electrical analogue signal, and recording said first and second analogue signals on said record medium.

19. A method as claimed in claim 18, wherein said second electrical analogue signal is composed of signals in two frequencies within the audio range and said signals are indicative of two frequency representation zeros and ones.

* * * * *